(12) United States Patent
Yan (10) Patent No.: US 10,253,768 B2
(45) Date of Patent: Apr. 9, 2019

(54) AIR PUMP

(71) Applicant: XIAMEN CONJOIN ELECTRONICS TECHNOLOGY CO., LTD., Xiamen (CN)

(72) Inventor: Hong Yan, Xiamen (CN)

(73) Assignee: XIAMEN CONJOIN ELECTRONICS TECHNOLOGY CO., LTD., Xiamen, Fujian (CN)

( * ) Notice: Subject to any disclaimer, the term of this patent is extended or adjusted under 35 U.S.C. 154(b) by 471 days.

(21) Appl. No.: 15/015,143

(22) Filed: Feb. 4, 2016

(65) Prior Publication Data

US 2017/0074260 A1    Mar. 16, 2017

(30) Foreign Application Priority Data

Sep. 11, 2015  (CN) ...................... 2015 2 0701748 U (51) Int. Cl.

| F04B 43/00 | (2006.01) |
|---|---|
| F04B 43/02 | (2006.01) |
| F04B 43/04 | (2006.01) |
| F04B 45/02 | (2006.01) |
| F04B 45/04 | (2006.01) |
| F04B 45/047 | (2006.01) |
| A61H 1/00 | (2006.01) |
| B60N 2/90 | (2018.01) |
| F04B 53/00 | (2006.01) |
| F04B 53/06 | (2006.01) |

(52) U.S. Cl.
CPC ........... *F04B 45/022* (2013.01); *A61H 1/008* (2013.01); *F04B 43/0045* (2013.01); *F04B 43/021* (2013.01); *F04B 43/026* (2013.01); *F04B 43/043* (2013.01); *F04B 45/02* (2013.01); *F04B 45/04* (2013.01); *F04B 45/043* (2013.01); *F04B 45/047* (2013.01); *B60N 2/914* (2018.02); *F04B 53/006* (2013.01); *F04B 53/06* (2013.01)

(58) Field of Classification Search
CPC ...... F04B 43/026; F04B 43/04; F04B 43/043; F04B 43/0045; F04B 45/022
See application file for complete search history.

(56) References Cited

U.S. PATENT DOCUMENTS

| 6,716,005 | B2 * | 4/2004 | Yamakawa | ........... F04B 43/026 417/521 |
|---|---|---|---|---|
| 9,194,389 | B2 * | 11/2015 | Yu | .......................... F04B 43/026 |
| 9,341,176 | B2 * | 5/2016 | Itahara | .................... F04B 43/02 |
| 9,375,155 | B2 * | 6/2016 | Sano | .................. A61B 5/02141 |
| 9,920,753 | B2 * | 3/2018 | Douglas | ................ F04B 43/021 |
| 9,951,769 | B2 * | 4/2018 | Fukami | ............... F04B 53/1072 |

\* cited by examiner

*Primary Examiner* — Peter J Bertheaud
(74) *Attorney, Agent, or Firm* — Scully Scott Murphy & Presser (57) ABSTRACT

An air pump is disclosed, the lower end of a drive shaft is in active connection with an eccentric hole on an eccentric wheel, and vents are opened on a hole wall of the eccentric hole to use as a heat sink in such a way to expose the lower end of the drive shaft to the outside through the vents, thereby facilitating cooling. In addition, the lower end of the drive shaft is formed into a reduced diameter section corresponding to vents, the edges of which are positioned on the reduced diameter section so as to increase an avoidance clearance, avoiding the friction generated between burrs generated on the edge of the vent upon manufacturing and the drive shaft, thereby improving the product life.

14 Claims, 10 Drawing Sheets

AIR PUMP

(a) TECHNICAL FIELD OF THE INVENTION

The present invention relates to an air pump, suitable for equipments such as car seat lumbar support system and massage chair.

(b) DESCRIPTION OF THE PRIOR ART

In the current technologies, air pumps suited to use in a car seat lumbar system roughly comprise a upper cover, a valve seat, an airbag seat, a base, airbags, a crank shaft, a drive shaft, an eccentric wheel and an electric motor. The electric motor is fixed below the base; the eccentric wheel is configured on a rotating shaft of the electric motor, an eccentric hole being formed on the eccentric wheel; a central hole is formed on the lower end of the crank shaft; the two ends of the drive shaft are respectively engaged with the eccentric hole and the central hole of the crank shaft, with one end of the drive shaft being of fixed connection and another end thereof being of active connection; one set of supports are formed radially outward from the center of the upper end of the crank shaft. The airbag seat is configured on the base, and a set of mounting holes corresponding to the set of supports of the crank shaft is formed on the airbag seat, with the airbag being mounted hermetically in each mounting hole, and the bottom of the airbag being configured on the corresponding support of the crank shaft. Furthermore, the valve seat is configured on the airbag seat hermetically, and the upper cover 1 the valve seat hermetically, with a central air outlet passage and outer air inlet passage corresponding to the airbags being formed between the valve seat and upper cover. Furthermore, an air inlet hole corresponding to each airbag is opened on the outer air inlet passage of the valve seat, and a one-way air inlet valve is mounted on the air inlet hole; an air outlet hole corresponding to each airbag is opened on the central air outlet passage of the valve seat, with a one-way air outlet valve being mounted on the air outlet hole; an air inlet port corresponding to the air inlet passage and an air outlet port corresponding to the central air outlet passage are respectively formed on the upper cover.

The working principle of the air pump mentioned above is: the rotating shaft of the electric motor is started to drive the eccentric wheel to rotate so as to drive the drive shaft to rotate. Thereafter, the drive shaft then drives the crank shaft to swing up and down in a curve. As a result, the supports of the crank shaft push and pull the airbags, thereby causing the airbags to be expanded or contracted. When the capacity of the airbag increases, a negative pressure (smaller than ambient atmosphere pressure) is generated in the airbag, the one-way air outlet valve closes the corresponding air outlet hole by the external air pressure, and the one-way air inlet valve opens the air inlet hole by the external air pressure; air flows into the outer air inlet passage from the air inlet port of the upper cover, and passes through the air inlet hole and the one-way air inlet valve into the airbag. Vice versa, when the capacity of the airbag is reduced, a positive pressure (larger than ambient atmosphere pressure) is generated in the airbag, the one-way air outlet valve opens the air outlet hole by the air pressure in the airbag, and one-way air inlet valve then closes the corresponding air inlet hole by the air pressure in the airbag; the airbag extrudes air out thereof through the air outlet hole and one-way air outlet valve to flow into the central air outlet passage and then be pumped out of the air outlet port of the upper cover. As a result, the pump function can be realized by reciprocating the above actions with the rotation of the electric motor.

When the air pumps are put into practical use, they have the following drawbacks:

1. one end of the drive shaft is of active connection; friction is generated between the active connection end of the drive shaft and an eccentric hole or central hole, and thus generates a great deal of heat causing the lower end of the eccentric wheel or crank shaft operated in coordination therewith to be softened very easily and even damaged. As a result, the transmission is terminated, affecting the service life of the air pump directly; according to the test, the existing pump life is less than 1,800 hours.
2. in the process of pump, friction will be generated between the outer wall of the hollow cylindrical airbag cavity and the inner wall of the airbag seat such that the designs of the sizes such as the wall thickness of the air bag are very important; if the wall of the airbag is too thin, the airbag is easy to be damaged to affect the service life thereof, or if the wall of the airbag is too thick, the elasticity of the airbag is affected, the pump efficiency thereof is low, and the production cost thereof is high.
3. the one-way air outlet valve is either some individual umbrella valves or a film set, the former has many components and is inconvenient in assembly, and the latter has a central column and four diaphragms radiating outward from the center, and is formed with positioning strips radiating outward from the center, the connection of diaphragm with the central column being formed with a necking section such that the structure thereof is relatively complicated.

SUMMARY OF THE INVENTION

To improve an air pump, and increase aeration efficiency, the present invention proposes an air pump in the premise of ensuring the aeration function.

The main object of the present invention is to provide an air pump, capable of improving the product life.

Another object of the present invention is to provide an air pump, improving the aeration efficiency.

Still another object of the present invention is to provide an air pump, simplifying the structure, and reducing the cost in premise of ensuring the aeration function.

To achieve the objects mentioned above, the present invention proposes an air pump constituted by a upper cover, a valve seat, an airbag seat, a base, airbags, a crank shaft, a drive shaft, an eccentric wheel and an electric motor, where the lower end of a drive shaft is in active connection with an eccentric hole on an eccentric wheel, and vents are opened on a hole wall of the eccentric hole to use as a heat sink in such a way to expose the lower end of the drive shaft to the outside through the vents, thereby facilitating cooling. In addition, the lower end of the drive shaft is formed into a reduced diameter section corresponding to vents, the edges of which are positioned on the reduced diameter section so as to increase an avoidance clearance, avoiding the friction generated between burrs generated on the edge of the vent upon manufacturing and the drive shaft.

the present invention also proposes an air pump constituted by a upper cover, a valve seat, an airbag seat, a base, airbags, a crank shaft, a drive shaft, an eccentric wheel and an electric motor, where the upper end of the drive shaft is in active connection with a central hole on the lower end of the crank shaft, wherein vents are opened on a hole wall of said central hole to use as a heat sink, allowing the upper end of the drive shaft to be exposed to the outside through the vents, thereby facilitating cooling. In addition, the upper end of said drive shaft corresponding to the vents is formed into a reduced diameter section, allowing edges of the vents to be positioned on the reduced diameter section so as to increase an avoidance clearance, avoiding the friction generated between burrs generated on the edge of the vent upon manufacturing and the drive shaft.

The vents are two vents or three vents distributed evenly passed through the hole wall of the active connection hole radially.

Mounting holes corresponding to the supports of the crankshaft are formed on the airbag seat mentioned above, where the hole wall of the mounting hole is extended downward to form an accommodating chamber, the top edges of the airbags ride on the top edge of the mounting hole of the airbag seat, the bottom of the airbag is mounted on the support of the crank shaft, the hollow cylindrical airbag cavity of the upper section of the airbag body is positioned on the accommodating chamber of the airbag seat, the extrusion entity of the lower section of the airbag body is positioned at the lower side of the accommodating chamber, the bottom of the hollow cylindrical airbag cavity is in connection with the extrusion entity through a lead angle. Furthermore, the cavity wall of the hollow cylindrical airbag cavity of the upper section of the airbag body is composed of a straight wall, lead angle R9.3±0.1 mm and lead angel R1.6±0.1 mm from top to bottom, the thickness of the cavity wall of the hollow cylindrical airbag cavity is 0.35±0.1 mm, the bottom of the hollow cylindrical airbag cavity is in connection with the top of the extrusion entity through a lead angle R0.3±0.1 mm.

The top edges of the airbags are connected together.

The one-way air outlet valve on the air outlet hole of the valve seat is an assembly valve, having a square cap and valve plate, the square cap covers a central square seat of the valve seat, a top of the square cap is extended outward to form a square sheet, a side of the square sheet is formed 45 degrees angle with a side of square cap, four corners of the square cap are respectively extended outward to form a positioning edge up to the side of the square sheet, a portion of the square sheet between the two adjacent positioning edges is the valve plate, and the valve plate is position on one side of the valve seat facing the upper cover and covers the air outlet hole of the valve seat.

A one-way air inlet valve configured on an air inlet hole of said valve seat is a single umbrella valve, having a umbrella stick and umbrella canopy, wherein the umbrella stick is inserted in the mounting hole of the valve seat, wherein two ends of the umbrella stick are respectively formed into block heads preventing the umbrella valve from loosing corresponding to the mounting hole of the valve seat, and the umbrella canopy covers the air inlet hole of the valve seat, the thickness of the entire umbrella canopy being uniform and a forward direction of said umbrella canopy is formed an acute angle with said umbrella stick.

From the structures mentioned above, the present invention has the following advantages compared with the prior art:

1. the active connection end of the drive shaft is configured with the heat sink in such a way that a great amount of heat generated from friction between the active connection end of the drive shaft and the active connection hole can be dissipated to the outside from the vents, thereby preventing the lower end of the eccentric wheel or the crank shaft from being deformed or damaged due to heat, ensuring the smooth transmission, and improving the life of the air pump; the life of the air pump of the present invention can be increased even more than 3,000 hours.
2. the hollow cylindrical airbag cavity of the upper section of the airbag body is positioned in the accommodating chamber of the airbag seat. The accommodating chamber can protect the airbag body, and the lead angle further facilitates the deformation and aeration of the airbag body. In addition, the wall thickness design of the hollow cylindrical airbag cavity and the lead angle R value design further improve the product life.
3. the one-way air outlet valve is a combination valve; the valve sheet is covered on the outlet hole under the action of the negative pressure, and when it is pushed away, the outlet hole is caused to open, achieving inflation in such a way that the components of the one-way outlet valve are few, production cost low, assembly convenient in the premise of ensuring the aeration function, only one square cap covering the square seat is enough.

The aforementioned and other objectives and advantages of the present invention will become clearer in light of the following detailed description of an illustrative embodiment of this invention described in connection with the drawings. It is intended that the embodiments and drawings disclosed herein are to be considered illustrative rather than restrictive.

DETAILED DESCRIPTION OF THE PREFERRED EMBODIMENTS

Referring to FIGS. 1 to 10, an air pump is constituted by a upper cover 1, valve seat 2, an airbag seat 31, a base 4, air bags 3, a crank shaft 5, a drive shaft 6, an eccentric wheel 71 and an electric motor 7.

The cooperation between the main components of the air pump is described as the following but not thus limited.

The electric motor 7 is fixed below the base 4; the eccentric wheel 71 is configured on a rotating shaft 72 of the electric motor 7, an eccentric hole 73 being formed on the eccentric wheel 71; a central hole 51 is formed on the lower end of the crank shaft 5; the two ends of the drive shaft 6 are respectively engaged with the eccentric hole 73 and the central hole 51 of the crank shaft 5, with one end of the drive shaft 6 being of fixed connection and another end thereof being of active connection; one set of supports (four supports in the figures) are formed radially outward from the center of the upper end of the crank shaft 5. The airbag seat 31 is configured on the base 4, and a set of mounting holes 32 (four mounting holes shown in the figures) corresponding to the set of supports 52 of the crank shaft 5 is formed on the airbag seat 31, with the airbag 3 being mounted hermetically in each mounting hole 32, and the bottom of the airbag 3 being configured on the corresponding support 51 of the crank shaft 5. Furthermore, the valve seat 2 is configured on the airbag seat 31 hermetically, and the upper cover 1 the valve seat 2 hermetically, with a central air outlet passage 21 and outer air inlet passage 22 corresponding to the airbags 3 being formed between the valve seat 2 and upper cover 1. Furthermore, an air inlet hole 23 corresponding to each airbag 3 is opened on the outer air inlet passage 22 of the valve seat 2, and a one-way air inlet valve 8 is mounted on the air inlet hole 23; an air outlet hole 24 corresponding to each airbag 3 is opened on the central air outlet passage 21 of the valve seat 2, with a one-way air outlet valve 9 being mounted on the air outlet hole 24; an air inlet port 11 corresponding to the air inlet passage 22 and an air outlet port 12 corresponding to the central air outlet passage 21 are respectively formed on the upper cover 1. In addition, the upper cover 1, valve seat 2, airbag seat 31 and base 4 are retained together through a snap spring 13 in order for the convenient assembly and detachment.

The working principle of the air pump mentioned above is: the rotating shaft 72 of the electric motor 7 is started to drive the eccentric wheel 71 to rotate so as to drive the drive shaft 6 to rotate. Thereafter, the drive shaft 6 then drives the crank shaft 5 to swing up and down in a curve. As a result, the supports 5 of the crank shaft 5 push and pull the airbags 3, thereby causing the airbags 3 to be expanded or contracted. When the capacity of the airbag 3 increases, a negative pressure (smaller than ambient atmosphere pressure) is generated in the airbag 3, the one-way air outlet valve 9 closes the corresponding air outlet hole 24 by the external air pressure, and the one-way air inlet valve opens the air inlet hole 23 by the external air pressure; air flows into the outer air inlet passage 22 from the air inlet port 11 of the upper cover 1, and passes through the air inlet hole 23 and the one-way air inlet valve 2 into the airbag 3. Vice versa, when the capacity of the airbag 3 is reduced, a positive pressure (larger than ambient atmosphere pressure) is generated in the airbag 3, the one-way air outlet valve 9 opens the air outlet hole 24 by the air pressure in the airbag 3, and one-way air inlet valve 8 then closes the corresponding air inlet hole 23 by the air pressure in the airbag 3; the airbag 3 extrudes air out thereof through the air outlet hole 24 and one-way air outlet valve 9 to flow into the central air outlet passage 21 and then be pumped out of the air outlet port 12 of the upper cover 1. As a result, the pump function can be realized by reciprocating the above actions with the rotation of the electric motor 7.

The improvement of the present invention is: a heat sink is configured on the active connection end of the drive shaft 6. The heat sink includes vents, which are opened on the hole wall of the active connection hole (eccentric 73 or central hole 51) of the drive shaft 6; here, two or three evenly distributed vents passed through the hole wall of the active connection hole are preferably formed, allowing the active connection end of the drive shaft 6 to be exposed to the outside through the vents. In high speed operation, a large amount of heat generated between the active connection end of the drive shaft 6 and the active connection hole thereof due to heat can be dissipated out through the vents, thereby protecting the lower end of the eccentric wheel 71 or crank shaft 5 from being deformed or damaged due to heat, ensuring a smooth transmission, and improving the service life of the air pump. After testing, the service life of the present invention is more than 3,000 hours, and the lubricant filled between the active connection hole and drive shaft 6 has no color change, volatilization, and is good in heat dissipation, does not reach the drop point of the lubricant, and the active connection hole is still normal even after being used for 3,000 hours.

Specifically, referring to FIGS. 1 to 4 again, the active connection end of the drive shaft 6 is a lower end, the active connection hole is the eccentric hole 73 on the eccentric wheel 71, i.e. the lower end of the drive shaft 6 is in active connection with the eccentric hole 73 in such a manner that the heat sink is configured on the eccentric wheel 71. The vents 74 are opened on the hole wall of the eccentric hole 73, and the lower end of the drive shaft 6 is formed into a reduced diameter section 61 correspondingly to the vent 53, the edge of which is positioned on the reduced diameter section 61. Thereupon, the reduced diameter section 61 can increase an avoidance clearance, avoid the friction generated between burrs generated on the edge of the vent 74 upon manufacturing and the drive shaft 6, thereby facilitating heat dissipation.

referring to FIGS. 5 and 6 again, the active connection end of the drive shaft 6 is a upper end, the active connection hole is the central hole 51 of the lower end of the crank shaft 5, i.e. the upper end of the drive shaft 6 is in active connection with the central hole 51 in such a manner that the heat sink is configured on the lower end of the crank shaft 5. The vents 53 are opened on the hole wall of the central hole 51, and the upper end of the drive shaft 6 is formed into a reduced diameter section 62 correspondingly to the vent 53, the edge of which is positioned on the reduced diameter section 62. Thereupon, the reduced diameter section 62 can increase an avoidance clearance, avoid the friction generated between burrs generated on the edge of the vent 53 upon manufacturing and the drive shaft 6, thereby facilitating heat dissipation.

Figure 8:
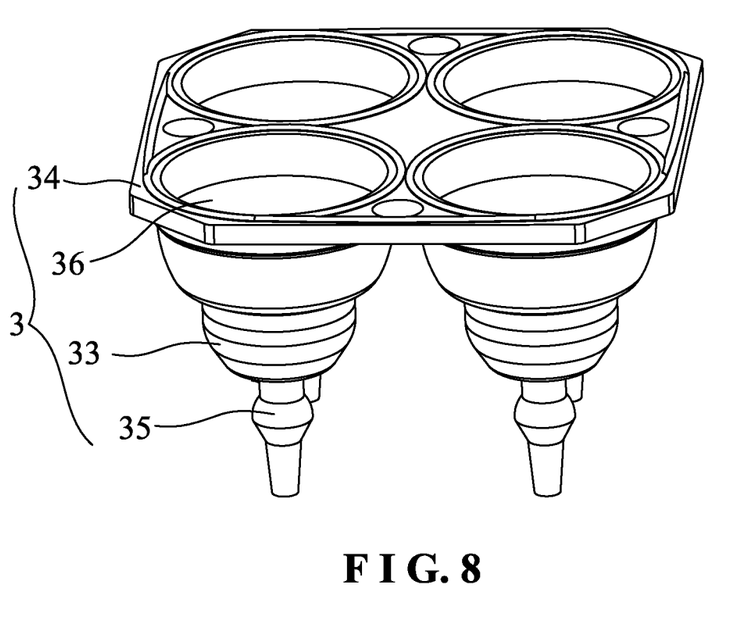
FIG. 8 is a schematically perspective view of airbags according to the present invention.
Figure 9:
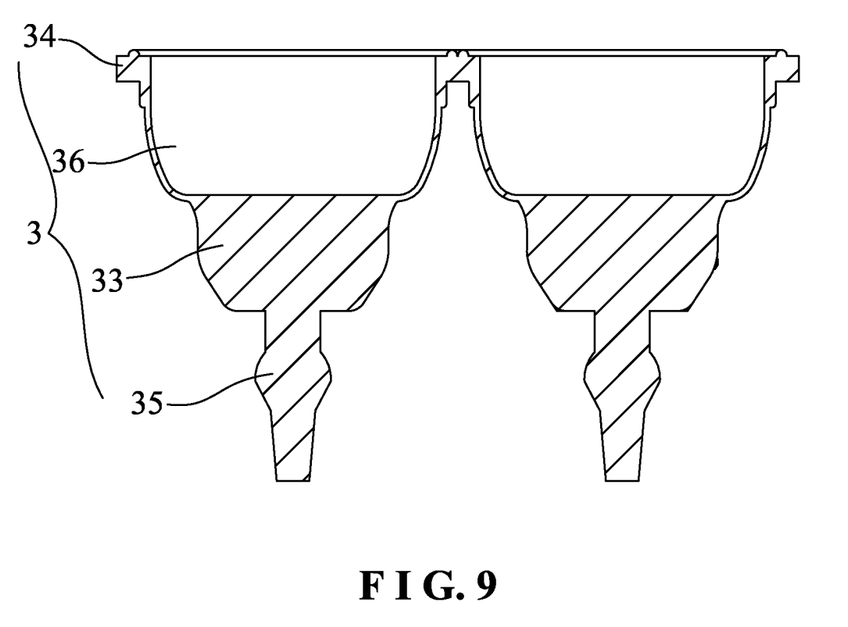
FIG. 9 is a cross-sectional view of the airbags.
Figure 10:
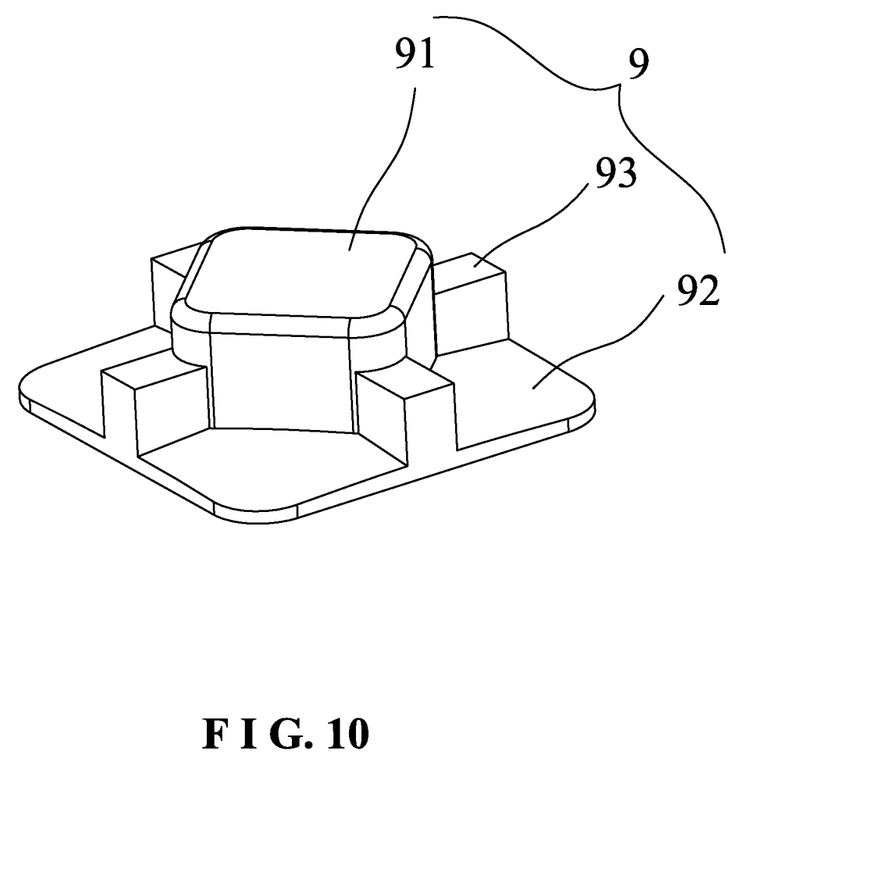
FIG. 10 is a schematically perspective view of a one-way air outlet valve of the present invention.

In addition to the existing structure, the airbag 3 may further use a specific structure, which is another improvement of the present invention: the hole wall of the mounting hole 32 of the airbag seat 31 corresponding to the support 52 of the crank shaft 5 is extended downward to form an accommodating chamber, the top edge 34 of the airbag 3 rides on the top edge the of the mounting hole 32 of the airbag seat 31. To simplify the structure and be convenient in assembly, the top edges of all the airbags 3 may be connected together. A bottom column 35 is mounted on the support 52 of the crank shaft 5, the upper section of the airbag body is a hollow cylindrical airbag cavity 36 positioned in the accommodating chamber of the airbag seat 31 which can protect the airbag body, where the cavity wall of the hollow cylindrical airbag cavity 36 preferably is 0.35 mm in thickness, and is composed of a straight wall, lead angle 89.30 mm and lead angle R1.65 mm from top to bottom, and the lower section of the airbag body 3 is an extrusion entity 33 positioned at the lower side of the accommodating chamber. Furthermore, the bottom of the hollow cylindrical airbag cavity 36 is connected to extrusion entity 33 through a lead angle R0.30 mm; multi-sectional lead angle R structure facilitates the deformation and pump of the airbag body, capable of avoiding wear and tear to further increase the product service life. After testing, the airbag 3 has no friction with the surroundings when the present invention is in no-load to load 40 kPa, which can ensure no friction will be generated in a normal working load range in order to achieve a high airbag service life.

As for the one-way air inlet valve 8, it has a umbrella stick 81 and umbrella canopy 82, where the umbrella stick 81 is inserted in the mounting hole 26 of the valve seat 2, where two ends of the umbrella stick 81 are respectively formed into block head 83 preventing the umbrella valve from loosing corresponding to the mounting hole 26 of the valve seat 2, and the umbrella canopy 82 covers the air inlet hole of the valve seat 2, the thickness of the entire umbrella canopy 82 being uniform and the forward direction of the umbrella canopy 32 is formed an acute angle with the umbrella stick 81.

Figure 1:
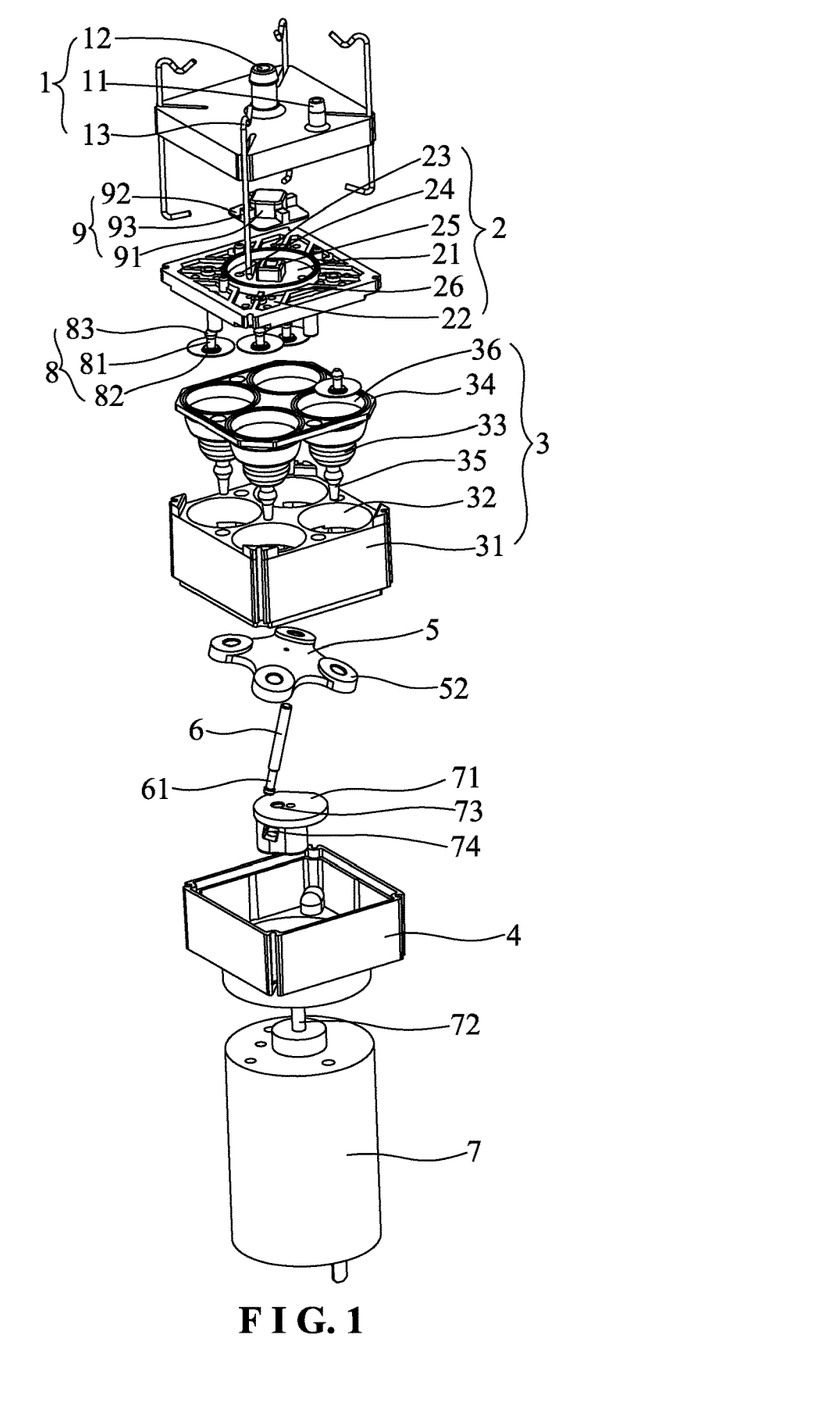
FIG. 1 is an exploded view of a preferred embodiment of a heat sink according to the present invention viewing from above.
Figure 2:
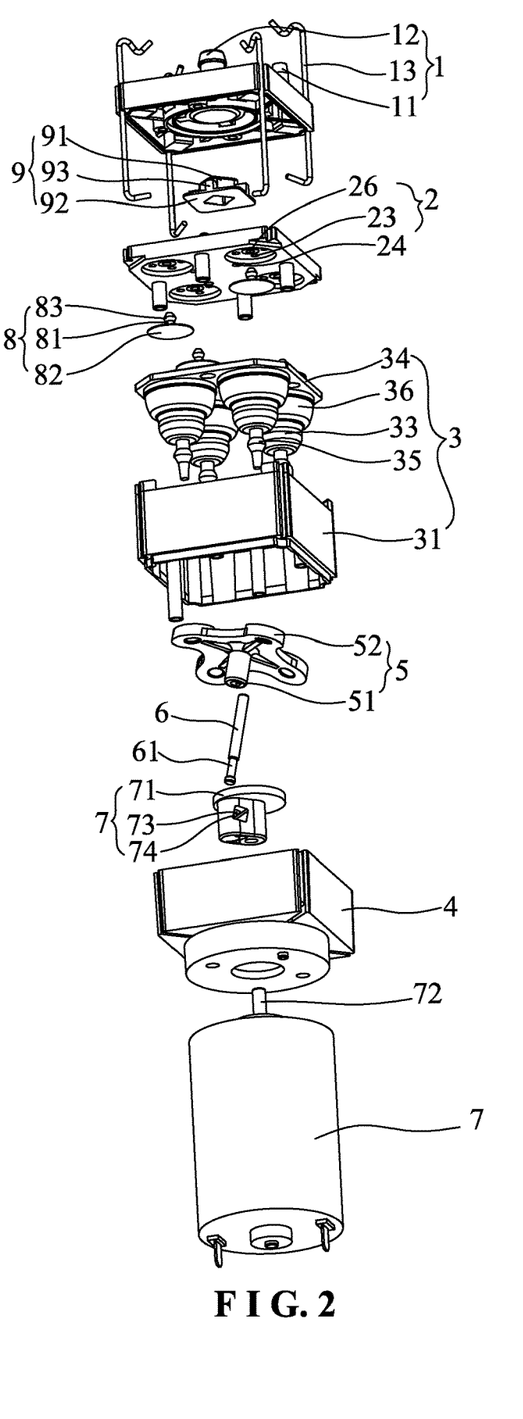
FIG. 2 is an exploded view of the embodiment of the heat sink according to the present invention viewing from below.
Figure 3:
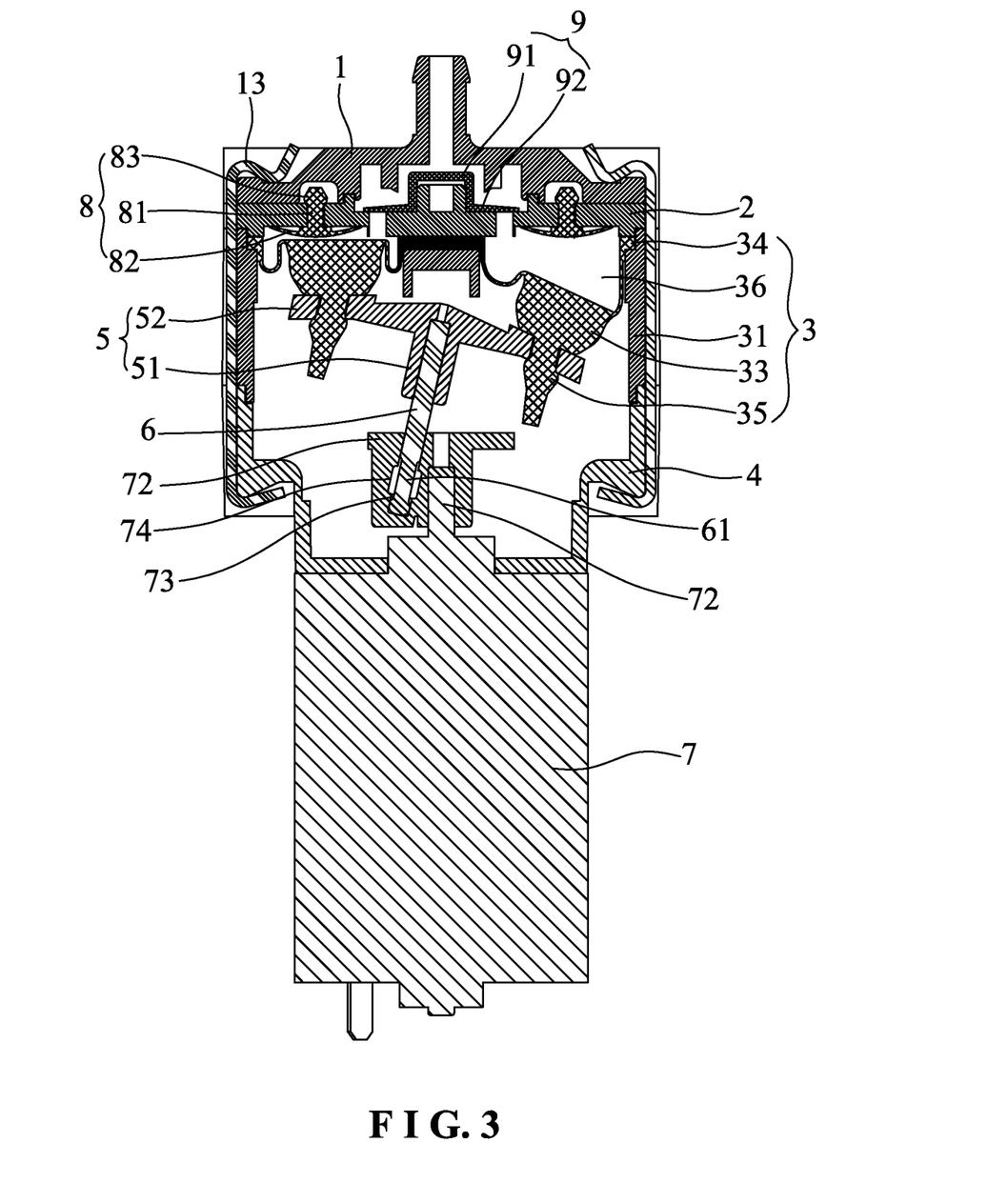
FIG. 3 is a cross-sectional view of the present invention.
Figure 4:
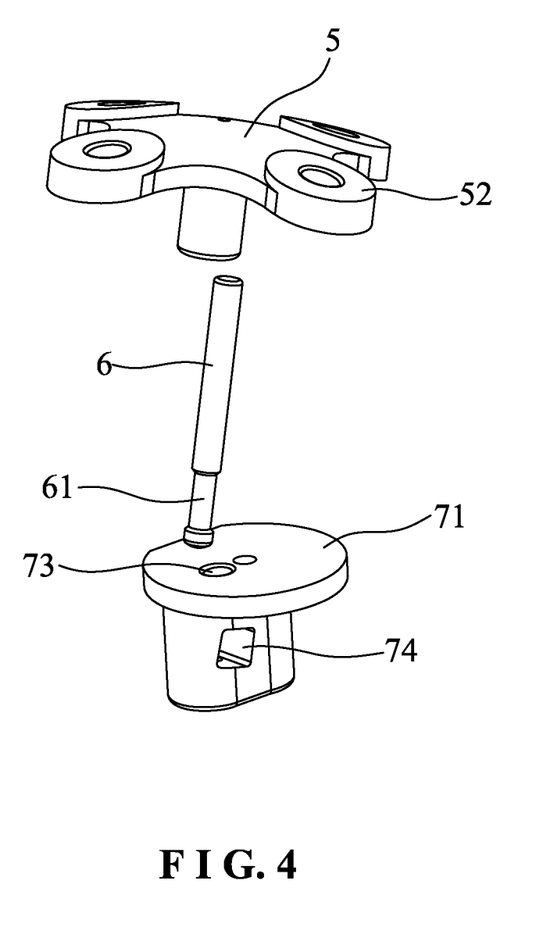
FIG. 4 is a partly enlarged view of FIG. 1.
Figure 5:
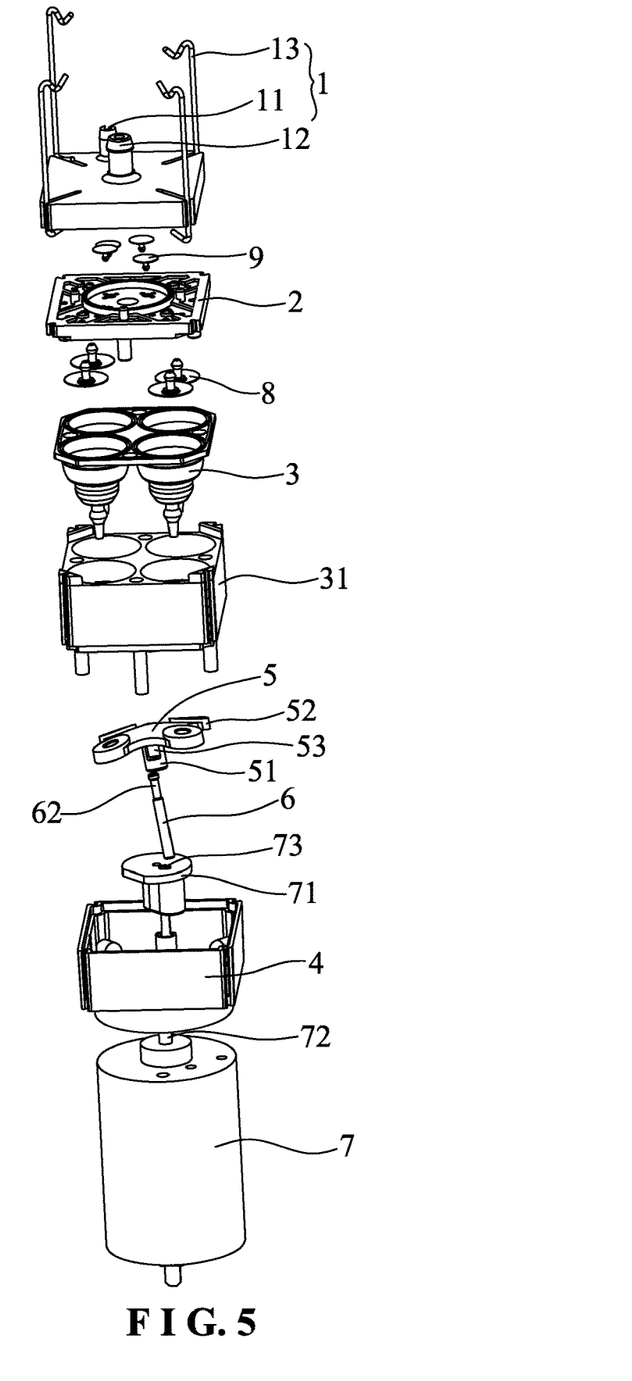
FIG. 5 is an exploded view of another preferred embodiment of a heat sink according to the present invention.
Figure 6:
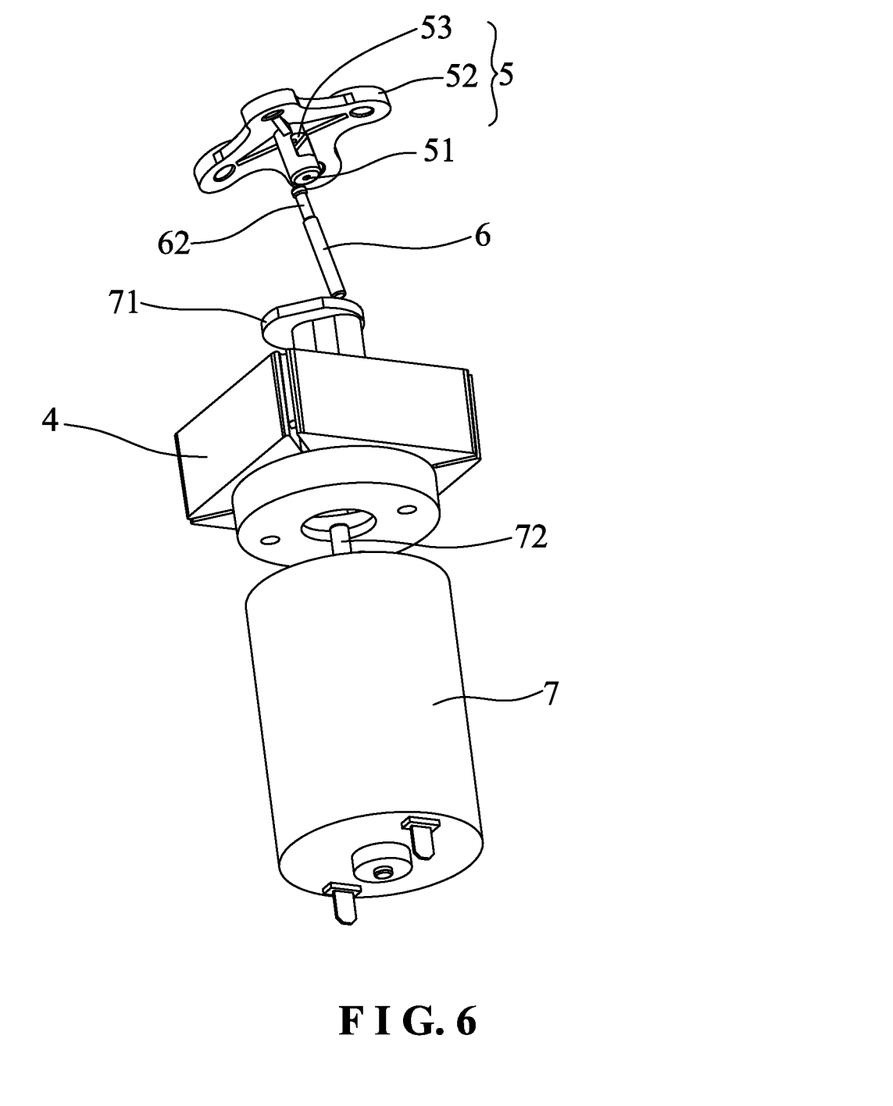
FIG. 6 is a partly enlarged view of FIG. 5.
Figure 7:
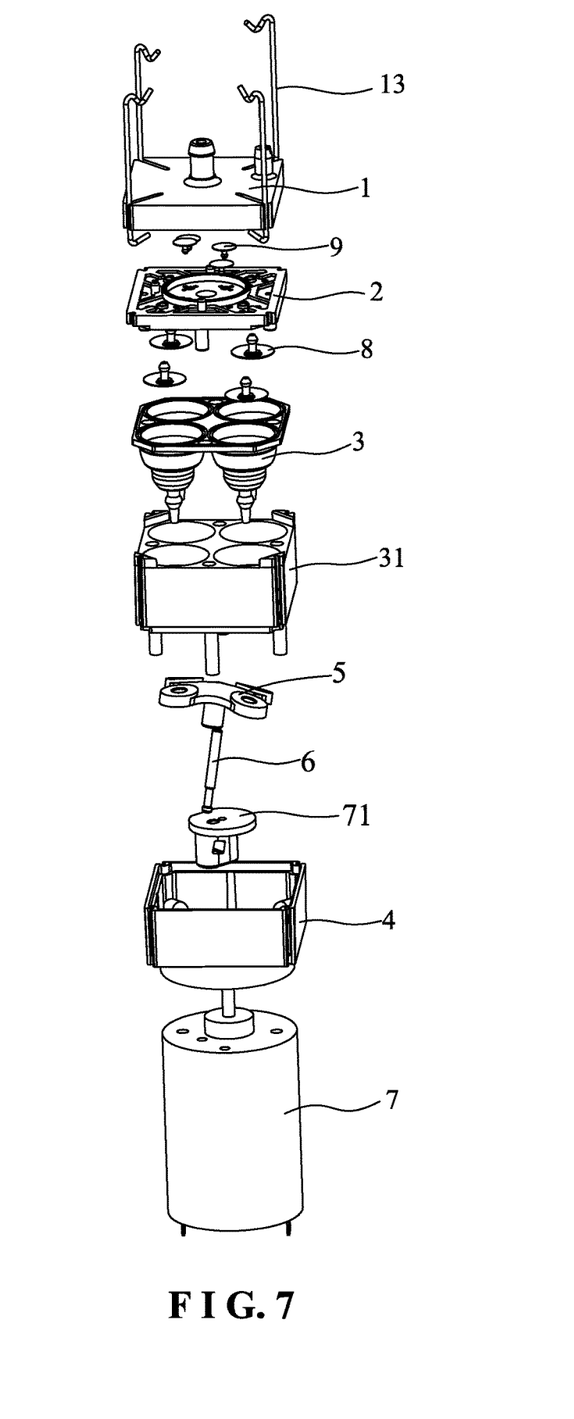
FIG. 7 is an exploded view of still another preferred embodiment of a heat sink according to the present invention viewing from above.

In addition to the structure (a single umbrella valve as FIG. 7 shows) same as the on-way air inlet valve 8, the one-way air outlet valve 9 may further use a specific structure as FIGS. 1 and 2 show, which is still another improvement of the present invention: the one-way air outlet valve 9 is an assembly valve having a square cap 91 and a valve plate 92, where the square cap 91 covers a central square seat 25 of the valve 2, where the bottom of the square cap 91 is extended downward to form a square sheet, the side a of which is formed 45 degrees angle with the side b of the square cap 91. In addition, the four corners of the square cap 91 are respectively extended outward to form a positioning edge 93 up to the side a of the square sheet, the square sheet portion between the adjacent two positioning edges 93 is the valve plate 92, which is positioned on the side of the valve seat 2 facing the upper cover 1 and covers the air outlet hole 24 of the valve seat 2. In the process of pump, the valve plate 92 covers the air outlet hole 24 under the negative pressure upon inhalation, and the valve plate 92 is pushed open upon pump, allowing the air outlet hole 24 to be opened to achieve air filling. Thus, in the premise of ensuring the pump functions, according to the present invention, the number of the components of the air outlet valve 8 is small, the production cost thereof is low, the assembly is convenient, and assembly cost is also low; only covering the square cap 91 on the square seat 25 is enough.

I claim:

1. An air pump, comprising:
   an upper cover, a valve seat, an airbag seat, a base, airbags, a crank shaft, a drive shaft, an eccentric wheel and an electric motor,
   wherein:
   a lower end of the drive shaft is in active connection with a hole wall of an eccentric hole of the eccentric wheel,
   vents are opened on the hole wall of the eccentric hole to use as a heat sink and pass through said hole wall radially, allowing the lower end of said drive shaft to be exposed to the outside through said vents, and
   said lower end of said drive shaft, corresponding to said vents, is formed into a reduced diameter section, allowing edges of said vents to be positioned on said reduced diameter section.

2. The air pump according to claim 1, wherein said vents are two vents or three vents distributed evenly.

3. The air pump according to claim 1, wherein mounting holes corresponding to supports of said crank shaft are formed on the airbag seat, hole walls of said mounting holes are extended downward to form an accommodating chamber, top edges of said airbags ride on a top edge of said mounting holes of said airbag seat, a bottom column is mounted on said supports of said crank shaft, said airbags each have an airbag body, a hollow cylindrical airbag cavity of an upper section of said airbag body is positioned in said accommodating chamber of said airbag seat, an extrusion entity of a lower section of said airbag body is positioned at a lower side of said accommodating chamber, and a bottom of said hollow cylindrical airbag cavity is in connection with said extrusion entity through a lead angle.

4. The air pump according to claim 3 wherein a cavity wall of said hollow cylindrical airbag cavity of said upper section of said airbag body is composed of a straight wall, lead angle R9.3±0.1 mm and lead angle R1.6±01 mm from top to bottom, said thickness of said cavity wall of said hollow cylindrical airbag cavity is 0.35±0.1 mm, and said bottom of said hollow cylindrical airbag cavity is in connection with a top of said extrusion entity through a lead angle R0.3±0.1 mm.

5. The air pump according to claim 3, wherein said top edges of said airbags are connected together.

6. The air pump according to claim 1, wherein a one-way air outlet valve on an air outlet hole of said valve seat is an assembly valve, having a square cap and valve plate, said square cap covers a central square seat of said valve seat, a top of said square cap is extended outward to form a square sheet, a side of said square sheet is formed 45 degrees angle with a side of square cap, four corners of said square cap are respectively extended outward to form a positioning edge up to said side of said square sheet, a portion of said square sheet between said two adjacent positioning edges is said valve plate, and said valve plate is positioned on one side of said valve seat facing said upper cover and covers said air outlet hole of said valve seat.

7. The air pump according to claim 1, wherein a one-way air inlet valve configured on an air inlet hole of said valve seat is a single umbrella valve, having a umbrella stick and umbrella canopy, wherein said umbrella stick is inserted in a mounting hole of said valve seat, wherein two ends of the umbrella stick, corresponding to said mounting hole of said valve seat, are respectively formed into block heads which prevent said umbrella valve from being loosened, and said umbrella canopy covers said air inlet hole of said valve seat, the thickness of said entire umbrella canopy being uniform and a forward direction of said umbrella canopy is formed an acute angle with said umbrella stick.

8. An air pump, constituted by an upper cover, a valve seat, an airbag seat, a base, airbags, a crank shaft, a drive shaft, an eccentric wheel and an electric motor, an upper end of said drive shaft being in active connection with a central hole on a lower end of said crank shaft, wherein vents are opened on a hole wall of said central hole to use as a heat sink, allowing said upper end of said drive shaft to be exposed to the outside through said vents, and said upper end of said drive shaft corresponding to said vents is formed into a reduced diameter section, allowing edges of said vents to be positioned on said reduced diameter section.

9. The air pump according to claim 8, wherein said vents are two vents or three vents distributed evenly passing through said hole wall of said central hole radially.

10. The air pump according to claim 8, wherein mounting holes corresponding to supports of said crank shaft are formed on the airbag seat, a hole wall of said mounting holes is extended downward to form an accommodating chamber, top edges of said airbags ride on a top edge of said mounting holes of said airbag seat, a bottom column is mounted on said supports of said crank shaft, said airbags each have an airbag body, a hollow cylindrical airbag cavity of an upper section of said airbag body is positioned in said accommodating chamber of said airbag seat, an extrusion entity of a lower section of said airbag body is positioned at a lower side of said accommodating chamber, and a bottom of said hollow cylindrical airbag cavity is in connection with said extrusion entity through a lead angle.

11. The air pump according to claim 10 wherein a cavity wall of said hollow cylindrical airbag cavity of said upper section of said airbag body is composed of a straight wall, lead angle R9.3+0.1 mm and lead angle R1.6±01 mm from top to bottom, said thickness of said cavity wall of said hollow cylindrical airbag cavity is 0.35±0.1 mm, and said bottom of said hollow cylindrical airbag cavity is in connection with a top of said extrusion entity through a lead angle R0.3±0.1 mm.

12. The air pump according to claim 10, wherein said top edges of said airbags are connected together.

13. The air pump according to claim 8, wherein an one-way air outlet valve on an air outlet hole of said valve seat is an assembly valve, having a square cap and valve plate, said square cap covers a central square seat of said valve seat, a top of said square cap is extended outward to form a square sheet, a side of said square sheet is formed 45 degrees angle with a side of square cap, four corners of said square cap are respectively extended outward to form a positioning edge up to said side of said square sheet, a portion of said square sheet between said two adjacent positioning edges is said valve plate, and said valve plate is positioned on one side of said valve seat facing said upper cover and covers said air outlet hole of said valve seat.

14. The air pump according to claim 8, wherein a one-way air inlet valve configured on an air inlet hole of said valve seat is a single umbrella valve, having a umbrella stick and umbrella canopy, wherein said umbrella stick is inserted in a mounting hole of said valve seat, wherein two ends of the umbrella stick, corresponding to said mounting hole of said valve seat, are respectively formed into block heads which prevent said umbrella valve from being loosened, and said umbrella canopy covers said air inlet hole of said valve seat, the thickness of said entire umbrella canopy being uniform and a forward direction of said umbrella canopy is formed an acute angle with said umbrella stick.

* * * * *